(12) United States Patent
Luzader et al.

(10) Patent No.: US 11,130,586 B2
(45) Date of Patent: Sep. 28, 2021

(54) LANE DIVIDING APPARATUS

(71) Applicant: GOODRICH CORPORATION, Charlotte, NC (US)

(72) Inventors: Michael A. Luzader, Laveen, AZ (US); Timothy C. Haynes, Prescott Valley, AZ (US)

(73) Assignee: GOODRICH CORPORATION, Charlotte, NC (US)

( * ) Notice: Subject to any disclaimer, the term of this patent is extended or adjusted under 35 U.S.C. 154(b) by 156 days.

(21) Appl. No.: 16/581,938

(22) Filed: Sep. 25, 2019

(65) Prior Publication Data

US 2021/0086905 A1 Mar. 25, 2021

(51) Int. Cl.
*B64D 25/14* (2006.01)
*B64D 25/18* (2006.01)

(52) U.S. Cl.
CPC ............ *B64D 25/14* (2013.01); *B64D 25/18* (2013.01)

(58) Field of Classification Search
CPC .................................. B64D 25/14; A62B 1/20
See application file for complete search history.

(56) References Cited

U.S. PATENT DOCUMENTS

| | | | | |
|---|---|---|---|---|
| 3,370,684 A * | 2/1968 | Holcombe | ............... | A62B 1/20 193/25 B |
| 3,463,915 A * | 8/1969 | Day | ...................... | B64D 25/14 362/34 |
| 3,470,991 A * | 10/1969 | Holcombe | ............... | A62B 1/20 193/25 B |
| 3,712,417 A * | 1/1973 | Chacko | ................... | B64D 25/14 182/48 |
| 3,833,088 A * | 9/1974 | Chacko | ................... | B64D 25/14 182/48 |
| 3,845,920 A * | 11/1974 | Satterfield | ............. | B64D 25/14 244/137.2 |
| 4,246,980 A * | 1/1981 | Miller | .................... | B64D 25/14 182/48 |
| 4,434,870 A * | 3/1984 | Fisher | ..................... | A62B 1/20 182/48 |
| 5,975,467 A * | 11/1999 | O'Donnell | ............ | B64D 25/14 182/48 |
| 6,298,970 B1 * | 10/2001 | Targiroff | ................ | B64D 25/14 193/25 B |
| 6,959,658 B2 * | 11/2005 | Gronlund | ............... | B64D 25/14 112/475.01 |
| 7,641,149 B2 * | 1/2010 | McDonald | ............ | B64D 25/14 244/137.2 |
| 9,701,411 B2 | 7/2017 | Kohlmeier-Beckmann et al. | | |

(Continued)

*Primary Examiner* — Philip J Bonzell
*Assistant Examiner* — Tye William Abell
(74) *Attorney, Agent, or Firm* — Snell & Wilmer L.L.P.

(57) ABSTRACT

An evacuation system may comprise a packboard, an evacuation slide configured to deploy from the packboard, and a lane dividing apparatus attached to the evacuation slide, the lane dividing apparatus comprising a strap having flexible material. The lane dividing apparatus may be a dual wall lane divider. The lane dividing apparatus may be a single lane dividing apparatus. The lane dividing apparatus may comprise a first patch disposed at a proximal end of the evacuation slide and a second patch disposed at a second end distal to the proximal end. The lane dividing apparatus may extend from the proximal end to the second end. The lane dividing apparatus may be taut upon deployment of the evacuation slide.

20 Claims, 5 Drawing Sheets

(56) References Cited

U.S. PATENT DOCUMENTS

| | | | | |
|---|---|---|---|---|
| 9,809,316 B2* | 11/2017 | Hartman | ............... | B64D 25/14 |
| 10,000,292 B1* | 6/2018 | Haynes | ............... | A62B 1/20 |
| 10,647,437 B2* | 5/2020 | Volny | ............... | B64D 25/14 |
| 2003/0234323 A1* | 12/2003 | Danielson | ............... | B64D 25/14 |
| | | | | 244/137.2 |
| 2005/0115794 A1* | 6/2005 | Zonneveld | ............... | A62B 3/00 |
| | | | | 193/5 |
| 2014/0009274 A1* | 1/2014 | Kohlmeier-Beckmann | ............... | |
| | | | | A62B 3/00 |
| | | | | 340/425.5 |
| 2016/0167794 A1* | 6/2016 | Kohlmeier-Beckmann | ............... | |
| | | | | A62B 1/20 |
| | | | | 182/18 |
| 2018/0273191 A1* | 9/2018 | Haynes | ............... | B64D 25/14 |
| 2019/0291881 A1* | 9/2019 | Hartman | ............... | B64D 25/14 |
| 2019/0315475 A1* | 10/2019 | Haynes | ............... | B64D 25/14 |

* cited by examiner

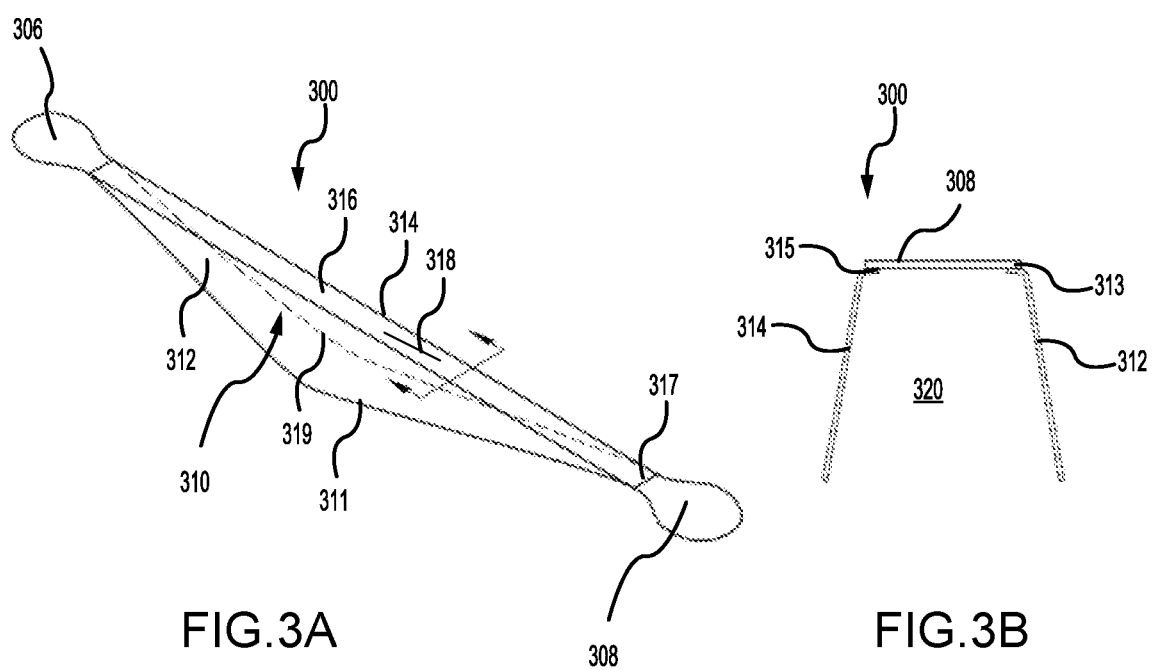

LANE DIVIDING APPARATUS

FIELD

The present disclosure relates to aircraft evacuation systems and, in particular, to an evacuation slide having a lane dividing apparatus.

BACKGROUND

Emergency evacuation systems, including inflatable evacuation slides, may be used to exit an aircraft absent a jet way or other suitable means of egress for passengers. The evacuation slides may deploy, for example, from the side of an aircraft fuselage. In the event of a water landing, the inflatable evacuation slide may be employed as a life raft. Current lane divider designs tend to employ an inflatable member, which can be complex to build and assemble.

SUMMARY

An evacuation system is disclosed herein. The evacuation system comprises: an evacuation slide comprising a proximal end and a distal end; and a lane dividing apparatus attached to the evacuation slide, the lane dividing apparatus comprising a strap having flexible material and a bottom portion, the lane dividing apparatus extending from the proximal end toward the distal end to a second end proximate the distal end, the bottom portion coupled to a center tube of the evacuation slide. In various embodiments, the lane dividing apparatus may be a dual wall lane divider. The dual wall lane divider may comprise a first wall disposed proximate a first slide lane and a second wall disposed opposite the first wall and proximate a second slide lane. The dual wall lane divider may comprise a top portion extending from the first wall to the second wall. The bottom portion of the dual wall lane divider may comprise a first edge of the first wall and a second edge of the second wall, the first edge disposed opposite the top portion and coupled to the center tube of the evacuation slide, the second edge disposed opposite the top portion and coupled to the center tube of the evacuation slide. The top portion may be taut in response to deployment of the evacuation slide. The lane dividing apparatus may comprise a single wall divider configured to be taut in response to the evacuation slide being deployed. The evacuation system may further comprise a proximal end tube extending normal to the proximal end of the evacuation slide, wherein the proximal end tube is coupled to the lane dividing apparatus. The lane dividing apparatus may comprise a cavity configured for storage.

A slide for an evacuation system is disclosed herein. The slide comprises: a sliding surface including a center tube; and a lane dividing apparatus comprising a strap attached to the center tube, a bottom portion of the lane dividing apparatus coupled to the center tube, a first patch of the lane dividing apparatus coupled to the center tube at a proximal end of the center tube, a second patch coupled to the center tube at a second end of the center tube, the second end disposed proximate a distal end of the center tube, the lane dividing apparatus extending from the first patch to the second patch.

In various embodiments, the lane dividing apparatus may be disposed between a first rail and a second rail of the slide. The lane dividing apparatus may be a dual wall lane divider. The dual wall lane divider may comprise a first wall disposed proximate a first slide lane and a second wall disposed opposite the first wall and proximate a second slide lane. The dual wall lane divider may comprise a top portion extending from the first wall to the second wall. The dual wall lane divider may comprise a first edge of the first wall and a second edge of the second wall, the first edge disposed opposite the top portion and coupled to the center tube of the slide, the second edge disposed opposite the top portion and coupled to the center tube of the slide. The top portion may be taut when the slide is deployed. The lane dividing apparatus may comprise a single wall divider configured to be taut when the slide is deployed. The lane dividing apparatus may comprise a cavity configured for storage.

A method of making an evacuation system is disclosed herein. The method comprises: attaching a lane dividing apparatus to a first end of a center tube of an evacuation slide; pulling the lane dividing apparatus toward a distal end of the evacuation slide until the lane dividing apparatus would be taut during operation; attaching the lane dividing apparatus to a second end of the center tube of the evacuation slide, the second end being distal to the first end; and attaching a bottom portion of the lane dividing apparatus to the center tube of the evacuation slide. In various embodiments, the lane dividing apparatus comprises a strap.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

FIG. 3A illustrates a perspective view of a lane dividing apparatus in a deployed position, in accordance with various embodiments;

FIG. 3B illustrates a cross-sectional view of a lane dividing apparatus in a deployed position, in accordance with various embodiments;

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option.

Throughout the present disclosure, like reference numbers denote like elements. Accordingly, elements with like element numbering may be shown in the figures but may not be necessarily repeated herein for the sake of clarity. As used herein, "proximate" refers to a direction inward, or generally, towards the reference component.

Evacuation systems of the present disclosure may include inflatable slides having a lane dividing apparatus. The lane apparatus may include a first strap, a second strap, and a divider portion extending between the first strap and the second strap. Thus, the lane dividing apparatus, may serve to divide the sliding surface into multiple sliding lanes, allowing for faster evacuation of passengers, and in the event of an evacuation event, the lane dividing apparatus may be taut (i.e., divider portion pulled tight between the first strap and the second strap) to serve as the lane divider. "Taut" as defined herein, is when a lane dividing apparatus extends beyond its nominal length.

Figure 1A:
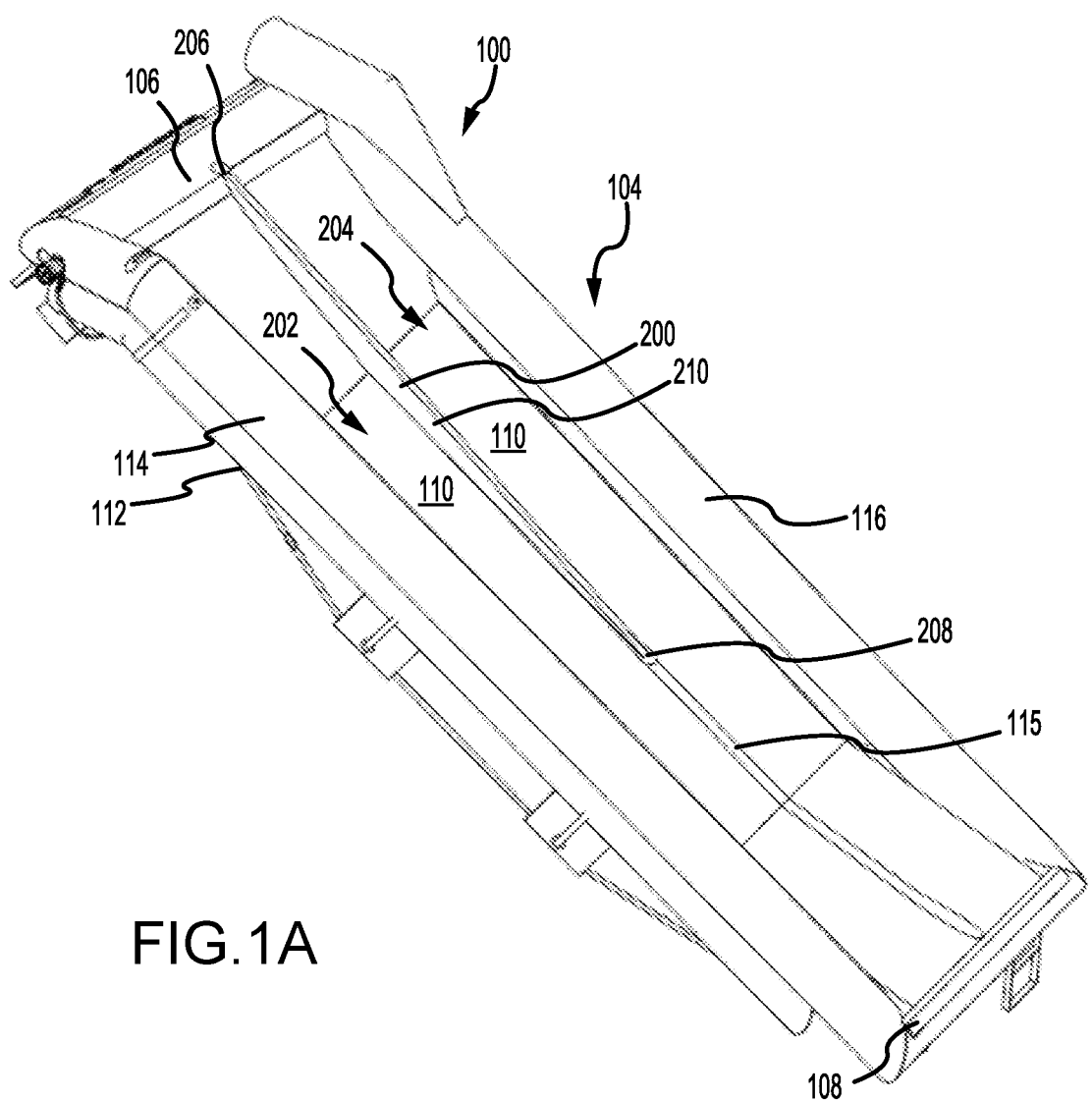
FIG. 1A illustrates a perspective view of an evacuation slide in a deployed position with a lane dividing apparatus in a slide mode position, in accordance with various embodiments.

With reference to FIG. 1A, an evacuation system 100 is illustrated, in accordance with various embodiments. Evacuation system 100 may comprise an evacuation slide 104. FIG. 1A illustrates evacuation slide 104 in an inflated and/or deployed position. Evacuation slide 104 may be deployed from an aircraft. Evacuation slide 104 may comprise an inflatable slide. Evacuation slide 104 may comprise a proximal end 106 and a distal end 108 opposite proximal end 106. Proximal end 106 may be coupled to an aircraft structure. Upon deployment, distal end 108 may contact an exit surface (e.g., the ground or the water) in response to evacuation slide 104 being deployed. In the event of a water landing, evacuation slide 104 may be uncoupled from the aircraft structure and serve as a life raft.

Figure 2:
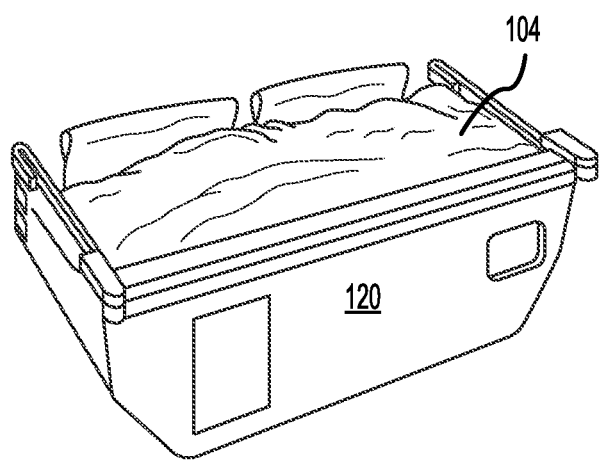
FIG. 2 illustrates a perspective view of an evacuation slide in a stowed position, in accordance with various embodiments.

Referring to FIG. 2, evacuation slide 104 is illustrated in a stowed and/or packed position. In this regard, evacuation slide 104 may be stowed in a packboard 120. In various embodiments, evacuation slide 104 may be folded in the stowed position. In various embodiments, evacuation slide 104 may be deployed from packboard 120 in response to opening an emergency exit door. Packboard 120 may be coupled to an aircraft in an installed position. Typically, a packboard 120 includes a blow-out panel which opens in response to deployment of evacuation slide 104 and through which the inflatable slide may exit the packboard 120. In this regard, evacuation slide 104 may be configured to be deployed from an aircraft.

Returning to FIG. 1A, evacuation slide 104 may comprise a sliding surface 110 and an underside surface 112 opposite sliding surface 110. Sliding surface 110 may extend from proximal end 106 to distal end 108. Evacuation slide 104 may comprise a first side rail 114, a second side rail 116, and a center tube 115 parallel and disposed between first side rail 114 and second side rail 116. First side rail 114, second side rail 116 and center tube 115 may be disposed on opposing sides of evacuation slide 104 and may extend from proximal end 106 to distal end 108. First side rail 114 and second side rail 116 may be integrally formed and in fluid communication. Stated differently, first side rail 114 and second side rail 116 may be part of a one, interconnected chamber that fills with gas upon deployment of evacuation slide 104.

Figure 1B:
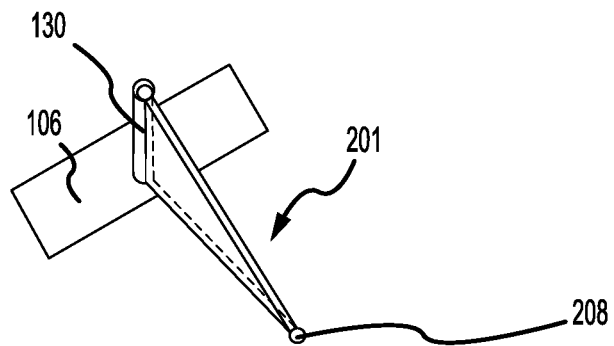
FIG. 1B illustrates a portion of an evacuation slide in a deployed position, in accordance with various embodiments.

Referring now to FIG. 1B, a portion of an evacuation system in accordance with various embodiments is illustrated. The evacuation system may further comprise a proximal end tube 130 extending substantially normal to proximal end 106. The proximal end tube 130 may be integrally formed with first side rail and second side rail and in fluid communication. Stated differently, first side rail 114, second side rail 116, and proximal end tube 130 may be part of a one, interconnected chamber that fills with gas upon deployment of evacuation slide 104. Proximal end tube 130 may be coupled to a lane dividing apparatus 201 by any method known in the art, such as adhesive bonding, sewing, or the like. The lane dividing apparatus 201 may extend from the proximal end tube 130 to second end 208.

Evacuation system 100 comprises a lane dividing apparatus 200 parallel disposed between first side rail 114 and second side rail 116. Lane dividing apparatus 200 may be attached to evacuation slide 104. Lane dividing apparatus 200 may divide evacuation slide 104 into two lanes. For example, lane dividing apparatus 200 may divide sliding surface 110 into a first slide lane 202 and a second slide lane 204. Lane dividing apparatus 200 may be disposed on center tube 115 and approximately half way between first side rail 114 and second side rail 116. Center tube 115 may provide structural support for the lane dividing apparatus 200 during operation. In various embodiments, lane dividing apparatus 200 may extend from proximal end 106 to between approximately a quarter way to distal end 108 and to distal end 108. In various embodiments, lane dividing apparatus 200 may extend from proximal end 106 approximately half way toward distal end 108. In various embodiments, sliding surface 110 may extend between first side rail 114 and second side rail 116.

In various embodiments, the lane dividing apparatus 200 comprises a strap such as a textile strap. The strap may comprise a flexible material, such as neoprene, urethane, nylon webbing, aramid or para-aramid fiber (such as that sold under the mark KEVLAR®), or the like. "Flexible material" as defined herein is a material that exhibits elastic properties and are characterized by the ability to bend or compress easily without cracking under normal conditions.

Lane dividing apparatus 200 may comprise a first end 206 located proximate proximal end 106, a second end 208 oriented toward distal end 108, and a divider portion 210 connecting first end 206 and second end 208. In various embodiments, a portion of divider portion 210 may be bonded to sliding surface 110. In various embodiments, divider portion 210 may be a loose portion. In various embodiments, the first end 206 and second end 208 each comprise a patch. The patch may be sewn to the evacuation slide 104 or coupled to the evacuation slide 104 via adhesives. In various embodiments, the patches are coupled to the evacuation slide 104 via adhesives.

Referring now to FIGS. 3A & 3B, a lane dividing apparatus 300, in accordance with various embodiments is depicted. The lane dividing apparatus 300 comprises a first patch 306 and a second patch 308. In various embodiments, the first patch 306 and the second patch 308 are configured to be bonded to the evacuation slide 104 of evacuation system 100 by any method known in the art. In various embodiments, the first patch 306 and the second patch 308 are sewn to the evacuation slide 104. The lane dividing apparatus 300 comprises a dual wall divider 310.

Dual wall divider 310 comprises a first wall 312 disposed proximate a first slide lane 202 (as seen in FIG. 1A) and a second wall 314 disposed proximate a second slide lane 204 (as seen in FIG. 1A). The dual wall divider comprises a top portion 316 disposed between the first wall 312 and the second wall 314. In various embodiments, the first wall 312, the second wall 314 and the top portion 316 are a monolithic strap. In various embodiments, the first patch 306, the second patch 308, and the dual wall divider 310 are a monolithic strap. In various embodiments, the lane dividing apparatus 300 is made of flexible material, such as neoprene, urethane, nylon webbing, aramid or para-aramid fiber (such as that sold under the mark KEVLAR®), or the like. or the like. In various embodiments, the first patch 306 and the second patch 308 are made a flexible material, such as neoprene, urethane, nylon webbing, aramid or para-aramid fiber (such as that sold under the mark KEVLAR®), or the like. In various embodiments, the dual wall divider 310 is made of neoprene, urethane fabric, or the like.

In various embodiments, the first wall 312 is sewn to the second patch 308 at a first joint 313 between the first wall 312 and the second patch 308 at a second end of the dual wall divider 310. Similarly, the second wall 314 may be sewn to the second patch 308 at a second joint 315 between the second wall 314 and the second patch 308. The top portion 316 may also be sewn to the second patch 308 at third join 317. Although described with respect to coupling the dual wall divider 310 to the second patch 308, coupling the dual wall divider 310 to the first patch 306 in a similar manner is within the scope of this disclosure.

In various embodiments, the first wall 312 comprises a first edge 311 disposed distal to the top portion 316 and adjacent to the center tube 115 (from FIG. 1A). Similarly, the second wall 314 may comprise a second edge 319 disposed distal to the top portion 316, adjacent to the center tube 115 (from FIG. 1A) and opposite the first edge 311. The first edge 311 and the second edge 319 may be coupled to the center tube 115 (from FIG. 1A) by any method known in the art. For example, the first edge 311 and the second edge 319 may be sewn to the center tube 115, bonded to the center tube 115, or the like.

In various embodiments, the first wall 312, the second wall 314, the top portion 316, and the center tube 115 (from FIG. 1A) may define a cavity 320. The cavity 320 may be used to store survival equipment, canopy components, or the like. In various embodiments, the lane dividing apparatus 300 may comprise an accessing apparatus 318 configured to open and access the cavity 320. In various embodiments, the accessing apparatus 318 is a zipper, overlapping hook and loop fastener, such as that sold under the mark VELCRO®, or any other accessing apparatus known in the art.

In various embodiments, the dual wall divider 430 is configured to be taught during operation of the evacuation system 100. In various embodiments, the single wall divider 410 may be stretched during deployment of evacuation system 100. The tautness of the dual wall divider 310 may prevent exiting passengers from crossing over from a first slide lane 202 (from FIG. 1A) to a second slide lane 204 (from FIG. 1A) when in use. A dual wall divider 310 may allow for a narrower evacuation system 100 compared to a tube wall divider, reducing cost and/or weight.

Figures 4A, 4B:
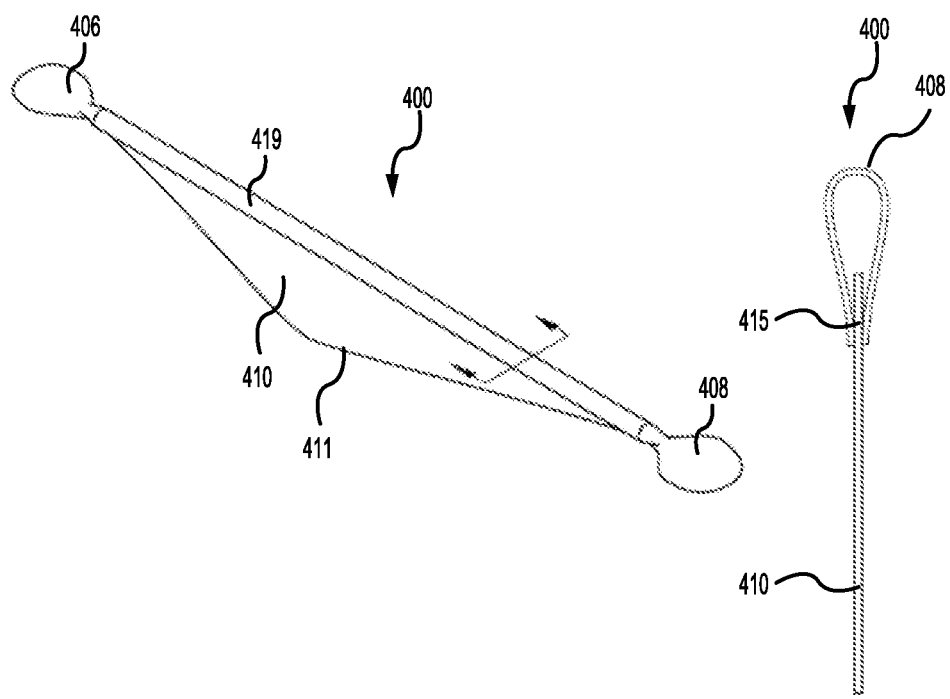
FIG. 4A illustrates a perspective view of a lane dividing apparatus in a deployed position, in accordance with various embodiments.
FIG. 4B illustrates a cross-sectional view of a lane dividing apparatus in a deployed position, in accordance with various embodiments.

Referring now to FIGS. 4A and 4B, a lane dividing apparatus 400, in accordance with various embodiments is depicted. The lane dividing apparatus 400 comprises a first patch 406 and a second patch 408. In various embodiments, the first patch 406 and the second patch 408 are configured to be bonded to the evacuation slide 104 of evacuation system 100. In various embodiments, the first patch 406 and the second patch 408 are sewn to the evacuation slide 104. The lane dividing apparatus 400 comprises a single wall divider 410.

Single wall divider 410 extends from first patch 406 to second patch 408. Single wall divider 410 comprises a top portion 419 and a bottom portion 411 disposed opposite the top portion 419. In various embodiments, the top portion 419 extends from the first patch 406 to the second patch 408. In various embodiments, the bottom portion 411 follows the contour of the evacuation slide 104 (from FIG. 1A). In various embodiments, the bottom portion 411 is coupled to the inflatable slide by any method known in the art, such as bonding or sewing.

In various embodiments, the first patch 406, the second patch 408, and the single wall divider 410 are a monolithic strap. In various embodiments, the lane dividing apparatus 400 is made of a flexible material, such as neoprene, urethane, nylon webbing, aramid or para-aramid fiber (such as that sold under the mark KEVLAR®), or the like. In various embodiments, the first patch 406 and the second patch 408 are made of a flexible material, such as neoprene, urethane, nylon webbing, aramid or para-aramid fiber (such as that sold under the mark KEVLAR®), or the like. In various embodiments, the single wall divider 410 is made of neoprene, urethane fabric, or the like.

In various embodiments, the second patch 408 comprises a loop extending from a first side of a first end of the single wall divider 410 around to a second side of the first end of the single wall divider 410. The first loop may be coupled to the single wall divider 410, by any method known in the art, such as sewing the loop to the first end of the single wall divider 410. Although described with respect to coupling the single wall divider 410 to the second patch 408, coupling the single wall divider 410 to the first patch 406 in a similar manner is within the scope of this disclosure.

In various embodiments, the single wall divider 410 is configured to be taught during operation of the evacuation system 100. In various embodiments, the single wall divider 410 may be stretched during deployment of evacuation system 100. The tautness of the single wall divider 410 may prevent exiting passengers from crossing over from a first slide lane 202 (from FIG. 1A) to a second slide lane 204 (from FIG. 1A) when in use. A single wall divider 410 may allow for a narrower evacuation system 100, reducing cost and/or weight.

Figure 5:
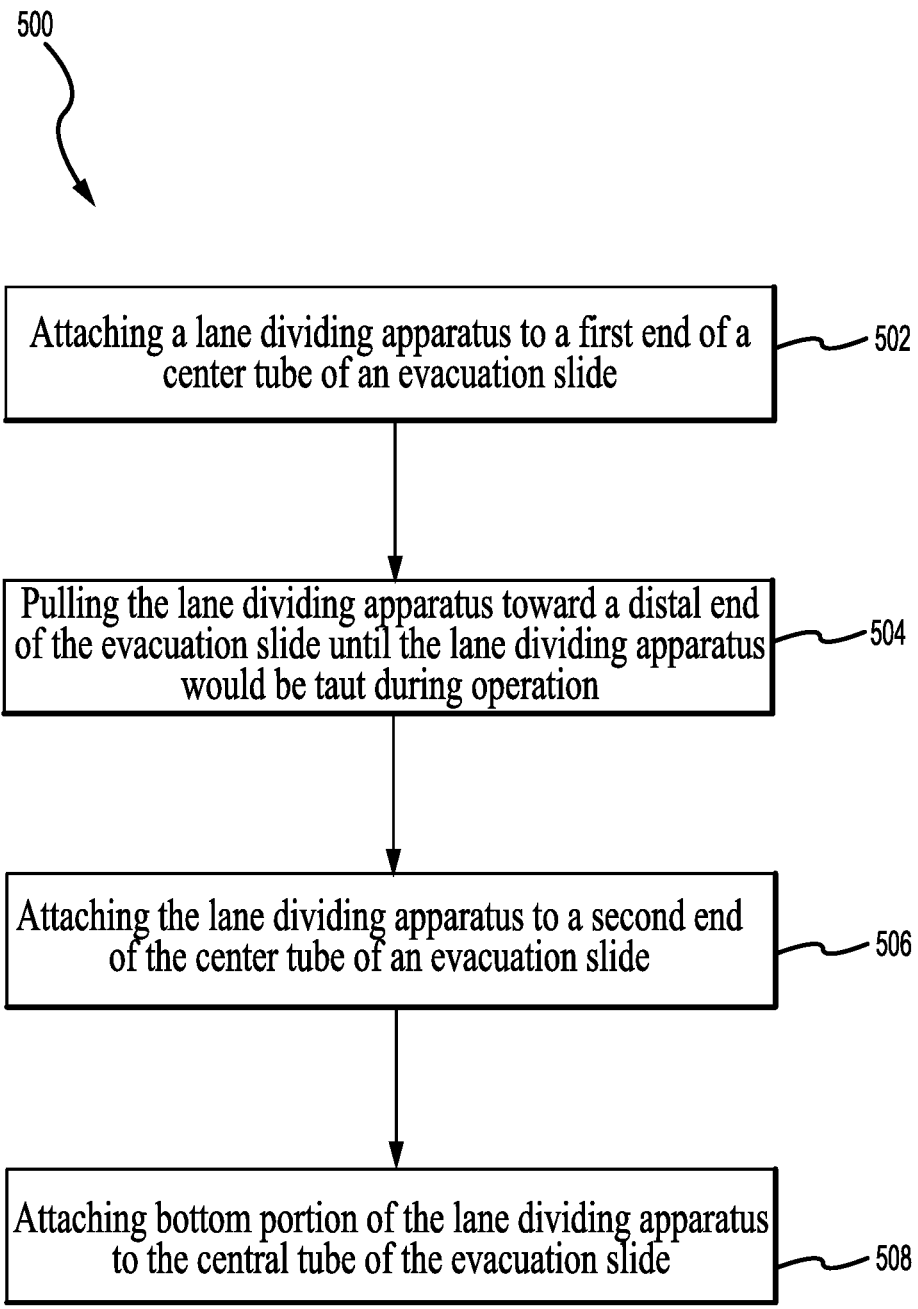
FIG. 5 illustrates a method of making an evacuation system, in accordance with various embodiments.

Referring now to FIG. 5, a method (500) of manufacturing an evacuation slide having a lane dividing apparatus is illustrated, in accordance with various embodiments. The method comprises attaching a lane dividing apparatus to a first end of a center tube of an evacuation slide (step 502). The lane dividing may comprise a first patch sewn or bonded to a wall divider (single or dual as disclosed in FIGS. 3A, 3B, 4A, and 4B). The first end may be proximate to a proximal end of the evacuation slide. The proximal end may be an area where evacuees of an aircraft enter the evacuation slide. The lane dividing apparatus may be coupled to the center tube by any method known in the art, such as adhesive bonding, sewing, or the like.

The method 500 may further comprise pulling the lane dividing apparatus toward a distal end of the evacuation slide until the lane dividing apparatus would be taut after inflation of the evacuation slide (step 504). By ensuring the lane dividing apparatus is taught after inflation and during operation, the lane dividing apparatus may prevent an evacuee from crossing from a first lane to a second lane.

The method 500 may further comprise attaching the lane dividing apparatus to a second end of the center tube of an evacuation slide (step 506). The second end may be opposite the first end at a point distal from the proximal end of the evacuation slide. The second end may be between a quarter of an evacuation slide length to the entire evacuation slide length.

The method may further comprise attaching a bottom portion of the lane dividing apparatus to the center tube (step 506). In various embodiments, the bottom portion may comprise a first edge and a second edge of a dual wall lane divider. In various embodiments, the bottom portion may comprise an edge of a single lane divider. The bottom portion may be attached by any method known in the art, such as adhesive bonding or sewing. The lane dividing apparatus may be configured to be taut after inflation of the slide.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An evacuation system, comprising:
    an evacuation slide comprising a proximal end and a distal end; and
    a lane dividing apparatus attached to the evacuation slide, the lane dividing apparatus being non-inflatable, the lane dividing apparatus comprising a strap having flexible material and a bottom portion, the lane dividing apparatus extending from the proximal end toward the distal end to a second end proximate the distal end, the bottom portion coupled to a center tube of the evacuation slide.

2. The evacuation system of claim 1, wherein the lane dividing apparatus comprises a single wall divider configured to be taut in response to the evacuation slide being deployed.

3. The evacuation system of claim 1, further comprising a proximal end tube extending normal to the proximal end of the evacuation slide, wherein the proximal end tube is coupled to the lane dividing apparatus.

4. The evacuation system of claim 1, wherein the lane dividing apparatus comprises a cavity configured for storage.

5. The evacuation system of claim 1, wherein the lane dividing apparatus is a dual wall lane divider.

6. The evacuation system of claim 5, wherein the dual wall lane divider comprises a first wall disposed proximate a first slide lane and a second wall disposed opposite the first wall and proximate a second slide lane.

7. The evacuation system of claim 6, wherein the dual wall lane divider comprises a top portion extending from the first wall to the second wall.

8. The evacuation system of claim 7, wherein the bottom portion of the dual wall lane divider comprises a first edge of the first wall and a second edge of the second wall, the first edge disposed opposite the top portion and coupled to the center tube of the evacuation slide, the second edge disposed opposite the top portion and coupled to the center tube of the evacuation slide.

9. The evacuation system of claim 7, wherein the top portion is taut in response to deployment of the evacuation slide.

10. A slide for an evacuation system, comprising:
    a sliding surface including a center tube; and
    a lane dividing apparatus comprising a strap attached to the center tube, a bottom portion of the lane dividing apparatus coupled to the center tube, a first patch of the lane dividing apparatus coupled to the center tube at a proximal end of the center tube, a second patch coupled to the center tube at a second end of the center tube, the second end disposed proximate a distal end of the center tube, the lane dividing apparatus extending from the first patch to the second patch, the lane dividing apparatus being non-inflatable.

11. The slide of claim 10, wherein the lane dividing apparatus is disposed between a first rail and a second rail of the slide.

12. The slide of claim 10, wherein the lane dividing apparatus comprises a single wall divider configured to be taut when the slide is deployed.

13. The slide of claim 10, wherein the lane dividing apparatus comprises a cavity configured for storage.

14. The slide of claim 10, wherein the lane dividing apparatus is a dual wall lane divider.

15. The slide of claim 14, wherein the dual wall lane divider comprises a first wall disposed proximate a first slide lane and a second wall disposed opposite the first wall and proximate a second slide lane.

16. The slide of claim 15, wherein the dual wall lane divider comprises a top portion extending from the first wall to the second wall.

17. The slide of claim 16, wherein the dual wall lane divider comprises a first edge of the first wall and a second edge of the second wall, the first edge disposed opposite the top portion and coupled to the center tube of the slide, the second edge disposed opposite the top portion and coupled to the center tube of the slide.

18. The slide of claim 16, wherein the top portion is taut when the slide is deployed.

19. A method of making an evacuation system, comprising:
   attaching a lane dividing apparatus to a first end of a center tube of an evacuation slide, the lane dividing apparatus being non-inflatable;
   pulling the lane dividing apparatus toward a distal end of the evacuation slide until the lane dividing apparatus would be taut during operation;
   attaching the lane dividing apparatus to a second end of the center tube of the evacuation slide, the second end being distal to the first end; and
   attaching a bottom portion of the lane dividing apparatus to the center tube of the evacuation slide.

20. The method of claim 19, wherein the lane dividing apparatus comprises a strap.

* * * * *